United States Patent [19]

Shinohara et al.

[11] Patent Number: 5,489,069

[45] Date of Patent: Feb. 6, 1996

[54] REVERSE ROTATION PREVENTATIVE DEVICE FOR FISHING REEL

[75] Inventors: Eiji Shinohara; Akira Yamaguchi, both of Tokyo, Japan

[73] Assignee: Daiwa Seiko, Inc., Tokyo, Japan

[21] Appl. No.: 383,948

[22] Filed: Feb. 6, 1995

Related U.S. Application Data

[62] Division of Ser. No. 92,469, Jul. 16, 1993.

[30] Foreign Application Priority Data

Jul. 17, 1992 [JP] Japan ................................. 4-55955
Jul. 30, 1992 [JP] Japan ................................. 4-59023

[51] Int. Cl.⁶ ............................................. A01K 89/01
[52] U.S. Cl. ........................ 242/247; 188/82.4; 242/300
[58] Field of Search ................................. 242/247, 248, 242/299, 300; 188/82.3, 82.4, 82.7, 82.77

[56] References Cited

U.S. PATENT DOCUMENTS

| | | | |
|---|---|---|---|
| 4,208,020 | 6/1980 | Gifford | 242/248 |
| 4,881,699 | 11/1989 | Emura | 242/248 |
| 5,042,741 | 8/1991 | Aota | 242/247 X |
| 5,221,057 | 6/1993 | Yoshikawa | 242/299 |
| 5,312,063 | 5/1994 | Hitomi | 242/248 |
| 5,318,243 | 6/1994 | Hitomi et al. | 242/247 |
| 5,350,129 | 9/1994 | Furomoto et al. | 242/300 |

FOREIGN PATENT DOCUMENTS 54-49891  4/1979  Japan.
63-64     1/1988  Japan.

*Primary Examiner*—John P. Darling
*Assistant Examiner*—Eileen A. Dunn
*Attorney, Agent, or Firm*—Longacre & White

[57] ABSTRACT

A reverse rotation preventive mechanism includes an engagement toothed portion formed on the inside circumferential surface of a rotor of a spinning reel so as to minimize the quantity of the unavoidable reverse rotation of the rotor to quicken hooking of a fish. A V-shaped engagement member having an engagement portion and an operating portion is swingably supported at the front portion of the casing of the spinning reel. The operating portion is engaged with a control member fitted on and frictionally engaged with a rotary quill. When the quill is rotated forward to wind a fishline on the reel, the control member is swung by the quill to disengage the engagement portion from the engagement toothed portion to make no contact noise at the forward rotation of the rotor and apply no resistance to the forward rotation. When the quill is rotated backward or reversely to unwind the fishline form the reel, the control member is swung by the quill to engage the engagement portion with the engagement toothed portion.

5 Claims, 5 Drawing Sheets

1

REVERSE ROTATION PREVENTATIVE DEVICE FOR FISHING REEL

This is a divisional of application Ser. No. 08/092,469, filed Jul. 16, 1993.

BACKGROUND OF THE INVENTION

The present device relates to a reverse rotation preventive mechanism for a fishing reel.

A fishing reel conventionally has a reverse rotation preventive mechanism for preventing the backward or reverse rotation of the rotor. The reverse rotation preventive mechanism is used, for instance, in a hooking action, to keep the fishline tightened when the fishline is wound on the spool after the fishline is unwound therefrom.

Such a fishing reel is disclosed in the Japanese Utility Model Examined Publication No. 63-64. The reverse rotation preventive mechanism of the reel includes a reverse rotation preventive member secured to the spool shaft of the reel, and an engagement member which can be engaged with the engagement toothed portion of the preventive member on the outside circumferential surface thereof to prevent the backward or reverse rotation of the rotor of the reel. The reverse rotation preventive mechanism also has an engagement restriction member for disengaging the engagement member from the engagement toothed portion when the rotor of the reel is rotated forward, so as not to generate a noise therefrom.

Since the reverse rotation preventive member of the reverse rotation preventive mechanism of the fishing reel disclosed in the above-mentioned Publication is provided at the center of the reel, the circumferential length of the member is not large enough and the central angle between the mutually adjacent engagement teeth of the engagement toothed portion of the member is not small. Since the number of the engagement teeth of the portion is 8, the central angle between the mutually adjacent teeth of the portion is 45 degrees. For that reason, the rotor is allowed to rotate backward or reversely by an angle of at most 45 degrees, after being rotated forward to wind a fishline on the reel by a desired quantity for the hooking action. In other words, as soon as the mechanism is put in action, the backward or reverse rotation of the rotor cannot always be prevented to keep the fishline tightened after being wound on the reel by the desired quantity.

Another conventional mechanism for preventing the reverse rotation of the rotor of a spinning reel for fishing, is disclosed in the Japanese Patent Application (OPI) No. 49891/79 (the term "OPI" as used herein means an "unexamined published application"). In the mechanism, engagement projections are formed on the inside circumferential surface of the rotor, and a stopper is supported at the front portion of the casing of the reel so as to be engageable with and disengageable from the projections, whereby the quantity of the unavoidable reverse rotation of the rotor is reduced to quicken and facilitate the hooking of a fish.

Since the stopper of this mechanism includes engagement portions extending in opposite, respective directions from a pivot point of the stopper so that one of the portions can be engaged with the engagement projections on the inside circumferential surface of the rotor and the other of the portions is engaged with a manipulation member, a large space needs to be provided at the front portion of the reel casing in a circumferential direction to dispose the stopper, a stopper support portion and a changeover means in place. For that reason, it is rather difficult to make the mechanism compact. Since the engagement projections come into contact with the latter engagement portion of the stopper at the time of the fishline winding rotation of the rotor, a loud contact noise is made and the resistance of the stopper to the rotation of the rotor is high when the circumferential velocity of the rotor is high.

SUMMARY OF THE INVENTION

The present device was made in order to solve the above-mentioned problem. Accordingly, it is an object of the invention to provide a reverse rotation preventive mechanism for a fishing reel, which can minimize the quantity of the unavoidable reverse rotation of a rotary member or a rotor, provide a large space around a central axis of the rotor and allow a noise-less forward rotation of the rotor.

In order to attain the above-noted and other objects, the present invention provides a reverse rotation preventive mechanism for a fishing reel having a rotary member supported on a casing and rotatable in conjunction with a rotation of a handle. The mechanism includes: an engagement toothed portion integrally formed on an inside circumferential surface of the rotary member; an engagement member pivotally supported on the casing and urged by a spring so as to be engaged with the engagement toothed portion to allow the rotary member to rotate relative to the casing in a first direction and to prevent the rotary member to rotate in a second direction opposite to the first direction; an engagement member controller supported on the rotary member so as to be prevented from coming off thereof and frictionally engaged with the rotary member so as to be rotated in conjunction with the rotation of the rotary member, the engagement member controller having a disengaging portion; and a restriction means provided on the casing for keeping the engagement member controller in a first position where the disengaging portion completely disengages the engagement member from engagement toothed portion against an urging force of the spring when the rotary member is rotated in the first direction.

The mechanism preferably further includes: a second restriction means provided on the casing for keeping the engagement member controller in a second position where the disengaging portion is not in contact with the engagement member when the rotary member is rotated in the second direction.

The engagement member controller used in the mechanism is preferably in the form of annulus having an outside circumferential surface frictionally engaged with the inside circumferential surface of the rotary member.

The mechanism preferably further includes: a changeover means provided on the reel casing for forcibly disengaging the engagement portion from the engagement toothed portion against an urging force of the spring to allow the rotary member to rotate in both the first and second directions. Further, it is preferably that the engagement member is substantially in the form of V-shape having a base end pivotally mounted on a support shaft projected on the casing and first and second arms extending from the base end, the engagement member being engaged with the toothed portion through the first arm and pivotally moved by the changeover means through the second arm.

The present invention further provides a reverse rotation preventive mechanism for a fishing reel having a rotary member secured to a rotary shaft supported on a casing and rotatable relative to the casing in conjunction with a rotation of a handle. The mechanism includes: an engagement toothed portion integrally formed on an inside circumferential surface of the rotary member; an engagement member pivotally supported on the casing and urged by a spring so as to be engaged with the engagement toothed portion to allow the rotary member to rotate relative to the casing in a first direction and to prevent the rotary member to rotate in a second direction opposite to the first direction, wherein the engagement member is substantially in the form of V-shape having a base end pivotally mounted on a support shaft projected on the casing and first and second arms extending from the base end, the engagement member is engaged with the toothed portion through the first arm and the second arm is radially disposed between the first arm and the rotary shaft with respect to the rotary member; an engagement member controller supported on the rotary shaft so as to be prevented from coming off thereof and frictionally engaged with the rotary shaft so as to be rotated in conjunction with the rotation of the rotary shaft, wherein the engagement member controller is coupled to the second arm; a restriction means for keeping the engagement member controller in a first position where the engagement controller pivotally move the engagement member through the second arm so that the first arm is completely disengaged from the engagement toothed portion against an urging force of the spring when the rotary member is rotated in the first direction; and a change-over means provided on the reel casing for forcibly disengaging the first arm from the engagement toothed portion against an urging force of the spring to allow the rotary member to rotate in both the first and second directions, pivotally moved by the change-over means through the second arm.

Since the engagement toothed portion of the reverse rotation preventive mechanism provided in accordance with the present invention is formed on the inside circumferential surface of the rotor or rotary member of the fishing reel at a large distance from the axis of the rotor, the circumferential length of the portion is large. For that reason, the number of the teeth of the portion can be made large to make the central angle between the mutually adjacent teeth of the portion small to minimize the quantity of the unavoidable reverse rotation of the rotor, which takes place after the mechanism is put in action for the prevention.

When the rotor of the fishing reel is rotated backward or reversely as the change-over member remains put in a position to allow the engagement portion of the engagement member to be engaged with the engagement toothed portion formed on the inside circumferential surface of the rotor by the urging force of the spring, the engagement portion of the engagement member is kept in engagement with the toothed engagement portion to prevent the rotor from being rotated backward or reversely any more. When the rotor is rotated forward to wind the fishline on the reel, the control member acts to the engagement member so that the engagement portion of the engagement member is completely disengaged from the engagement toothed portion to allow the rotor to be rotated forward to wind the fishline on the reel without generating any noise. When the change over means is put in the other position to keep the engagement portion of the engagement member disengaged from the engagement toothed portion, the rotor can be rotated either forward or backward.

Since the engagement toothed portion is formed on the inside circumferential surface of the rotary member or rotor and the engagement member is substantially in the form of V-shape having the first and second arms extending from the base end in which the second arm is radially disposed between the first member and the rotary shaft with respect to the rotary member, a large space can be provided around and near the central axis of the rotary member.

DETAILED DESCRIPTION OF THE PREFERRED EMBODIMENTS

Preferred embodiments of the present invention will now be described in detail with reference to the drawings attached hereto.

Figure 1:
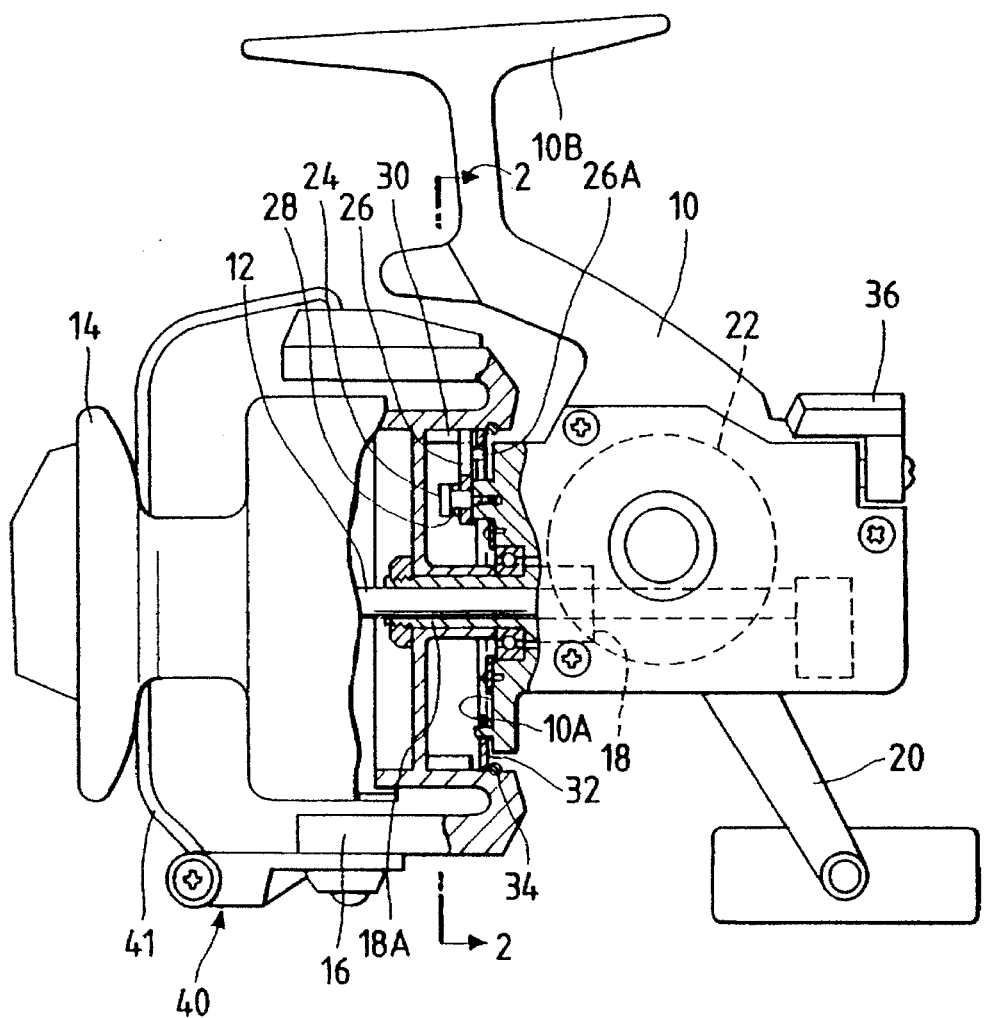
FIG. 1 is a cutaway side view of a fishing reel having a reverse rotation preventive mechanism which is an embodiment of the present invention.
Figure 2:
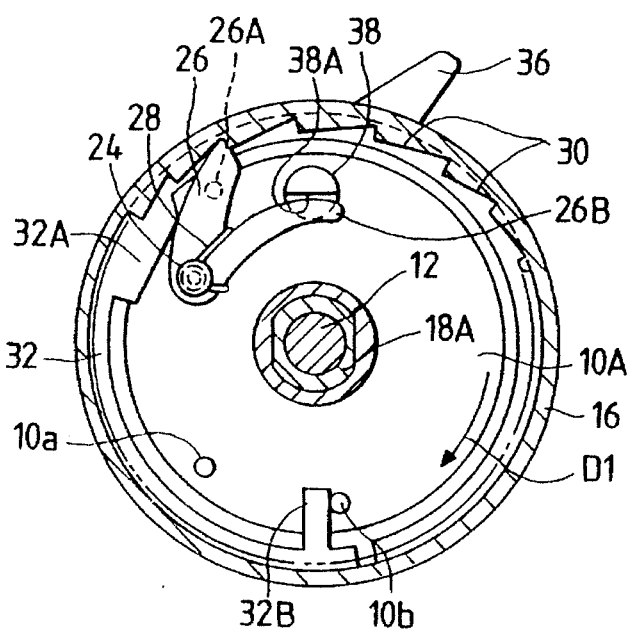
FIG. 2 is a cross-sectional view of the mechanism along lines II—II shown in FIG. 1.
Figure 3:
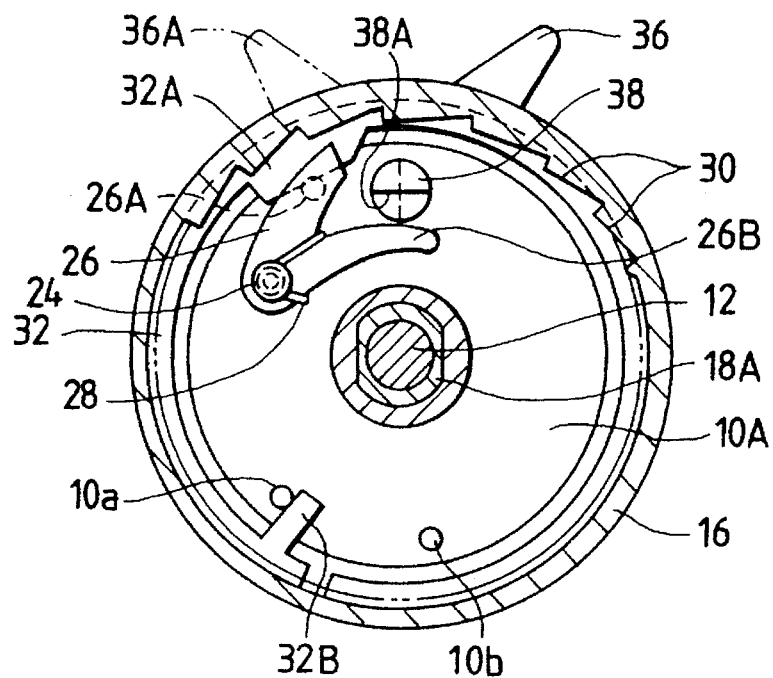
FIG. 3 is a cross-sectional view of the mechanism to illustrate the operation thereof in connection with the state of the mechanism, which is shown in FIG. 2.

FIGS. 1, 2 and 3 show a reverse rotation preventive mechanism which is an embodiment of the present invention and is for preventing the backward or reverse rotation of the rotor of a fishing reel. The reel includes a casing 10, a hanger 10B, a spool shaft 12, a spool 14, the rotor 16, a pinion 18, a rotary quill 18A, a handle 20, a drive gear 22, a pin 24, a V-shaped engagement member 26, a spring 28, an engagement member controller 32, a stop ring 34, a manipulation member 36, and a cam member 38. The mechanism includes the V-shaped engagement member 26, the spring 28, an engagement toothed portion 30 formed on the inside circumferential surface of the rear portion of the rotor ! 6 along the circumference thereof and having a large number of engagement teeth, the engagement member controller 32, the stop ring 34 made of a spring, the manipulation member 36, and the cam member 38.

The casing 10 is conjoined to the hanger 10B which is for fastening the fishing reel to a fishing rod. The spool shaft 12 is supported by the casing 10 so that the spool shaft 12 can be reciprocated back and forth by a reciprocation mechanism which is operated in conjunction with the turning of the handle 20. The spool 14 on which a fishline is wound is mounted on the spool shaft 12 at the tip thereof. The handle 20 is provided at the side of the casing 10. The drive gear 22 is integrally formed on the rotary shaft of the handle 20, and engaged with the pinion 18 provided on the rear portion of the rotary quill 18A, which is rotated together with the rotor 16. When the handle 20 is turned, the rotor 16 provided with a fishline guide mechanism 40 having a bail 41 is rotated through the gears 18 and 22, and the quill 18A and the spool 14 are reciprocated through the reciprocation mechanism 40 so that the fishline is wound onto the spool 14 uniformly.

The V-shaped engagement member 26 is attached at the base portion thereof to the casing 10 at the front end 10A thereof so that the member can be swung about the pin 24. The spring 28 is fitted in the engagement member 26, and always urges the engagement member 26 toward the engagement toothed portion 30 to usually engage one of the arms of the engagement member 26 with the engagement toothed portion 30.

The engagement member controller 32 which is annularly shaped is provided inside the inside circumferential surface of the rear portion of the rotor 16 near the engagement toothed portion 30, and frictionally engaged with the surface so as to be rotatable in conjunction with the rotation of the rotor 16. The stop ring 34 is fitted in the groove of the inside circumferential surface of the rotor 16 outside the engagement member controller 32 to prevent the engagement member controller 32 from coming off from the inside circumferential surface of the rotor 16. The engagement member controller 32 has a disengaging portion 32A projecting toward the center of the annularly shaped engagement member controller 32 so that when the engagement member controller 32 is rotated, through the frictional engagement, in a direction D1 by the rotor 16 along with the rotation thereof as shown in FIG. 2, the disengaging portion 32A comes into contact with the engagement projection 26A of the engagement member 26 to push the engagement projection 26A down from the engagement toothed portion 30 of the rotor 16 toward the center of the rotor 16 against the urging force of the spring 28. The engagement member controller 32 has a rotation restricting portion 32B projecting toward the center of the engagement member controller 32 and located away from the disengaging portion 32A. The casing 10 has two stoppers 10a and 10b at the front end 10A of the casing. The stoppers are located in prescribed positions on either side of the rotation restricting portion 32B.

The manipulation member 36 is kinematically connected to the cam member 38 whose tip portion is semicylindrically shaped. The members 36 and 38 constitute a changeover means. The position of the manipulation member 36, which is shown by a full line in FIG. 3, corresponds to the direction of the plane 38A of the semicylindrically shaped tip portion of the cam member 38, which is shown by a full line in FIG. 3. When the manipulation member 36 is put in a position shown by a two-dot chain line 36A in FIG. 3, the cam member 38 is turned by an angle of 90 degrees so that the plane 38A of the tip portion thereof is oriented in a direction shown by a two-dot chain line in FIG. 3.

The operation of the fishing reel and that of the reverse rotation preventive mechanism are described in detail from now on. When the manipulation member 36 is put in the position shown by the full line in FIGS. 2 and 3 so that the plane 38A of the tip portion of the cam member 38 is oriented toward the center of the rotor 16, the V-shaped engagement member 26 is engaged with the engagement toothed portion 30 of the rotor 16 by the urging force of the spring 28. At that time, the rotor 16 is allowed to be rotated forward by turning the handle 20, as shown by an arrow D1 in FIG. 2, despite the contact of the engagement member 26 with the rotor 16 because of the form of each engagement tooth of the engagement toothed portion 30 of the rotor 16, and the engagement member controller 32 is rotated in the same direction D1 as the rotor 16 together therewith due to the friction between them so that the disengaging portion 32A of the engagement member controller 32 comes into contact with the engagement projection 26A of the engagement member 26 to push it down toward the center of the rotor 16 to disengage the engagement member 26 from the engagement toothed portion 30. As the engagement member 26 remains thus disengaged from the engagement toothed portion 30, the rotation restricting portion 32B of the controller 32 comes into contact with the stopper 10a of the casing 10 so that although the rotor 16 is rotated, the controller is held at a standstill in relative slippage on the inside circumferential surface of the rotor 16 to keep the engagement member 26 separated from the engagement toothed portion 30 as shown in FIG. 3. Therefore, a click noise is not made by the engagement member 26 and the toothed engagement portion 30 while the rotor 16 is rotated forward in the direction D1 to wind the fishline on the spool 14.

When the rotor 16 is rotated backward or reversely to the direction D1 as the reel is in a state shown by FIG. 3, the engagement member controller 32 is rotated backward together with the rotor 16 due to the friction between them so that the disengaging portion 32A of the controller is separated from the engagement projection 26A of the engagement member 26 to engage it with the engagement toothed portion 30 by the urging force of the spring 28, as shown in FIG. 2. Because of the engagement, the rotor 16 cannot be rotated backward or reversely any more.

Figure 4:
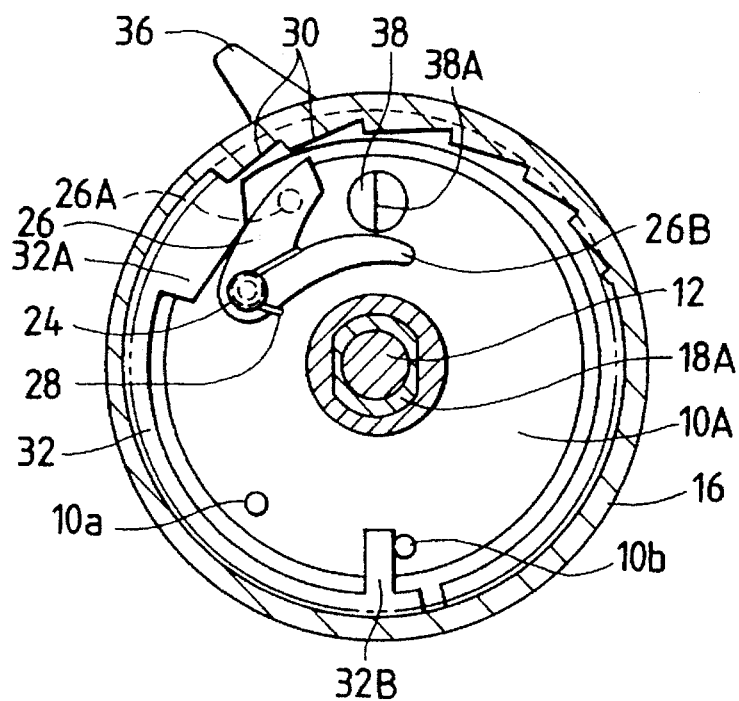
FIG. 4 is a cross-sectional view of the mechanism to illustrate the operation thereof in connection with the state of the mechanism, which is shown in FIG. 2.
Figure 5:
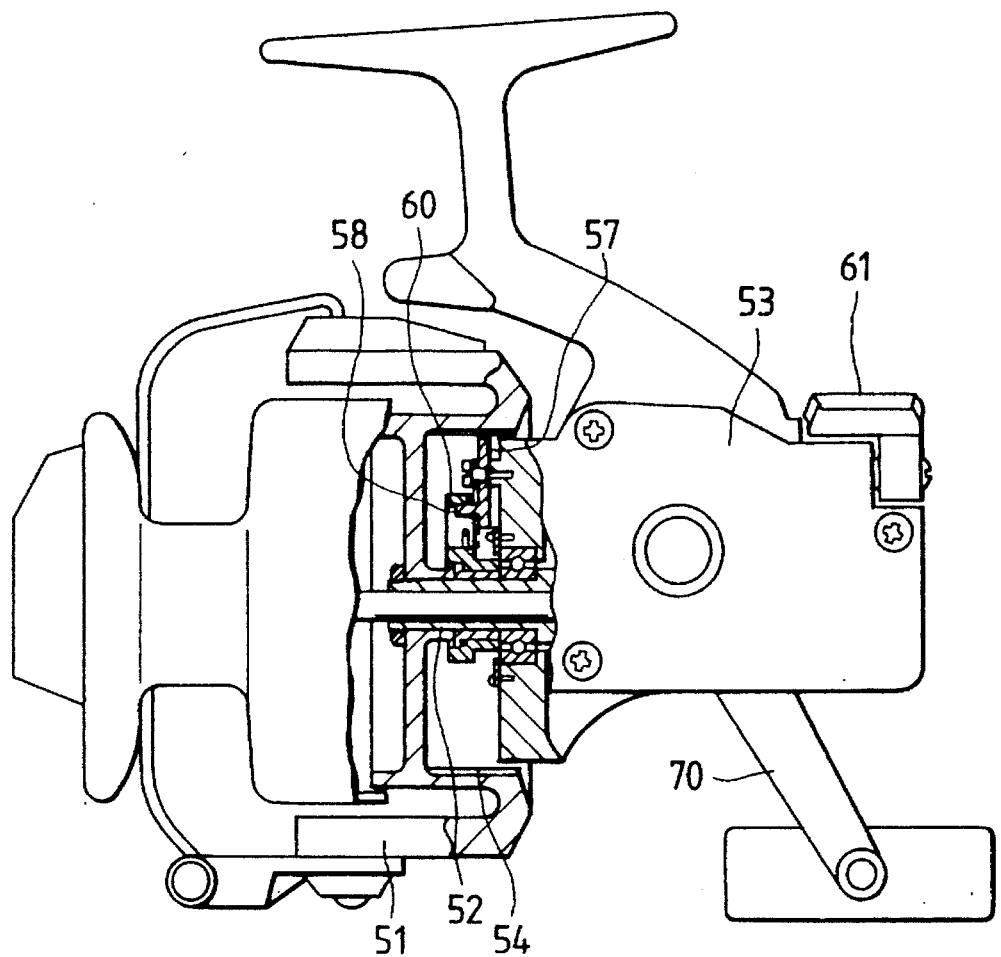
FIG. 5 is a cutaway side view of a reverse rotation preventive mechanism which is another embodiment of the present invention.
Figure 6:
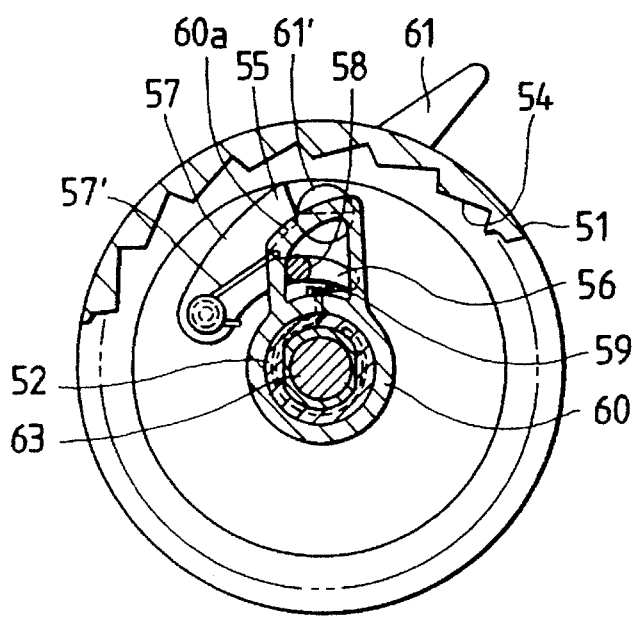
FIG. 6 is a cross-sectional view of the mechanism shown in FIG. 5, in the state that the rotor is rotated forward to wind a fishline on the reel.

When the manipulation member 36 is in the position shown by the full line in FIGS. 2 and 3, the rotor 16 cannot be rotated backward or reversely to unwind the fishline from the spool 14. When the manipulation member 16 is put in the other position shown by the two-dot chain line in FIG. 3, the plane 38A of the cam member 38 is oriented as shown by the other two-dot chain line in FIG. 3, so that the plane does not face the operating portion 26B of the engagement member 26, but the outside circumferential surface of the cam member is put in contact with the operating portion 26B, as shown in FIG. 4, to keep the engagement member 26 away from the engagement toothed portion 30. Since keeping the engagement member 26 away from the engagement toothed portion 30 is independent of the position of the disengaging portion 32A of the engagement member controller 32, the rotor 16 can be rotated either forward or backward.

When the rotor 16 is rotated backward or reversely, the engagement member controller 32, frictionally engaged with the inside circumferential surface of the rotor 16 is rotated backward together therewith so that the rotation restricting portion 32B of the engagement member controller 32 comes into contact with the other stopper 10b of the casing 10 to prevent any more rotation of the engagement member controller despite the continuation of the backward or reverse rotation of the rotor 16.

Since the engagement toothed portion 30 is provided on the inside circumferential surface of the rotor 16 at a large distance from the center thereof, the circumferential length of the engagement toothed portion 30 is large. For that reason, the number of the engagement teeth of the portion 30 can be made large to make the central angle between the mutually adjacent teeth of the engagement toothed portion 30 small to minimize the quantity of the unavoidable reverse rotation of the rotor 16. The loosening of the fishline can thus be minimized in the hooking action or the like. Since the engagement member controller 32 is provided on the inside circumferential surface of the rotor 16, a spatial margin is generated near the center of the rotor 16 to make it possible to make the reverse rotation preventive mechanism compact, dispose an additional click mechanism or the like near the center of the rotor 16 easily, and facilitate the assembly of the reel. The engagement member controller 32 functions, in conjunction with the forward rotation of the rotor 16, to disengage the V-shaped engagement member 26 from the engagement toothed portion 30, thereby enabling the noise-less forward rotation of the rotor 16.

A second embodiment of the present invention will be described with reference to the drawings attached hereto.

FIGS. 5–8 show a mechanism which is the second embodiment and is for preventing the reverse rotation of the rotor 51 of a spinning reel for fishing. The reel includes a handle 70, the rotor 51, a rotary quill 52, a casing 53, a V-shaped engagement member 57, a spring 57', a wound spring 59, a control member 60, a manipulation member 61, a spool 62, and a spool shaft 63. The mechanism includes the V-shaped engagement member 57, the spring 57', the wound spring 59, the control member 60, and the manipulation member 61.

The rotor 51 is secured to the rotary quill 52 supported by the casing 53 so that the quill is rotated by turning the handle 70, to rotate the rotor. The rear half portion of the rotor 51 has an engagement toothed portion 54 on the inside circumferential surface of the portion. The V-shaped engagement member 57 includes an engagement portion 55 and an operating portion 56, and is supported at the base portion of the member by the front portion of the casing 53 and urged by the spring 57' in such a direction as to engage the engagement portion with the engagement toothed portion 54. The operating portion 56 has an engagement projection 58.

Figure 7:
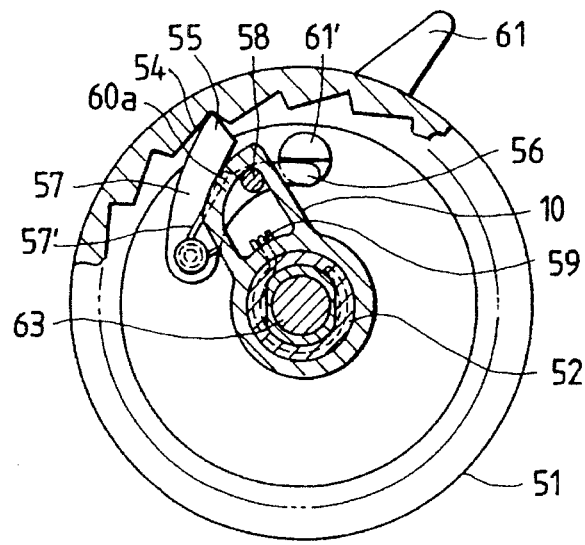
FIG. 7 is a cross-sectional view of the mechanism shown in FIG. 5, in the state that the rotor is rotated backward or reversely to unwind the fishline from the reel.

The wound spring 59 is engaged with the control member 60 fitted on the rotary quill 52 so that the control member is swung by the quill along with the rotation thereof. The restrictive engagement portion 60a of the control member 60 is engaged with the engagement projection 58 so that when the quill 52 is rotated forward or clockwise as to FIG. 6 to rotate the rotor 51 forward to wind a fishline on the spool 62 by the rotor 51, the control member is swung clockwise to disengage the engagement portion 55 of the engagement member 57 from the engagement toothed portion 54 of the rotor through the restriction of the engagement projection 58 by the restrictive engagement portion 60a to allow the rotor 51 to be rotated forward, and that when the 52 quill is rotated backward or counterclockwise as to FIG. 6 or 7 to rotate the rotor 51 backward or reversely to unwind the fishline from the spool 62, the control member 60 is swung counterclockwise to undo the restriction of the engagement projection 58 by the restrictive engagement portion 60a to engage the engagement portion 55 with the engagement toothed portion 54 by the urging force of the spring 57', as shown in FIG. 7, to prevent the rotor from being rotated backward or reversely any more. The manipulation member 61 having a cam portion 61' at the tip of the member 61 is supported at the rear portion of the casing 53 so that the member 61 can be swung into a position to push the operating portion 56 of the V-shaped engagement member 57 by the cam portion 61 to keep the engagement portion 55 of the V-shaped engagement member 57 disengaged from the engagement toothed portion 54 of the rotor 51.

Figure 8:
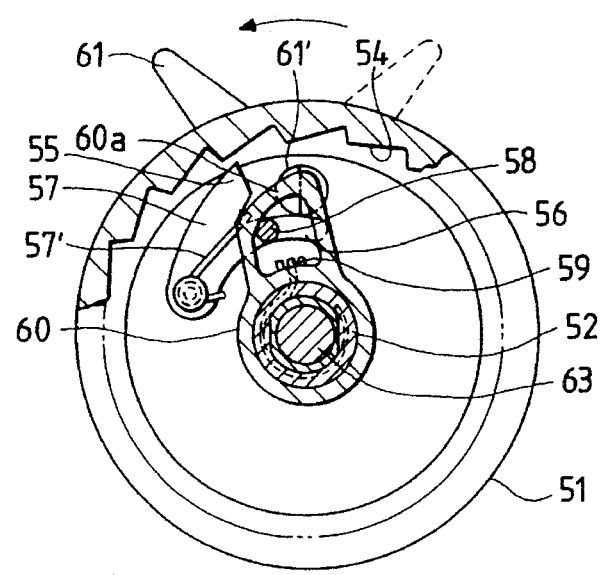
FIG. 8 is a cross-sectional view of the mechanism shown in FIG. 5 in the state that the rotor can be rotated either forward or backward.

When the rotary quill 52 is rotated forward to rotate the rotor 51 forward to wind the fishline on the spool 62 by the rotor 51 as the manipulation member 61 is not in the position to push the operating portion 56 of the V-shaped engagement member 57 by the cam portion 61' of the manipulation member 61 to keep the V-shaped engagement portion 55 of the engagement member 57 disengaged from the engagement toothed portion 54 of the rotor 51, the control member 60 is swung by the rotary quill 52 along with the rotation thereof to disengage the engagement portion 55 from the toothed engagement portion through the action of the operating portion 56 to allow the rotor 51 to be rotated forward to wind the fishline on the spool 62 by the rotor 51. When the rotary quill 52 is rotated backward or reversely to rotated the rotor 51 backward or reversely to unwind the fishline from the spool 62, the engagement portion 55 of the V-shaped engagement member 57 is engaged with the engagement toothed portion 54 of the rotor 51 through the action of the operating portion 56 of the V-shaped engagement member 57to prevent the rotor 51 from being rotated backward or reversely any more. If the manipulation member 61 is then put in the position to push the operating portion 56 of the V-shaped engagement member 57 by the cam portion 61' of the manipulation member 61 to keep the engagement portion 55 of the V-shaped engagement member 57 disengaged from the engagement toothed portion 54 of the rotor 51, as shown in FIG. 8, the engagement member 57 is kept away from the engagement toothed portion 54 so that the rotor 51 can be rotated either forward or backward by rotating the rotary quill 52 forward or backward.

Figure 9:
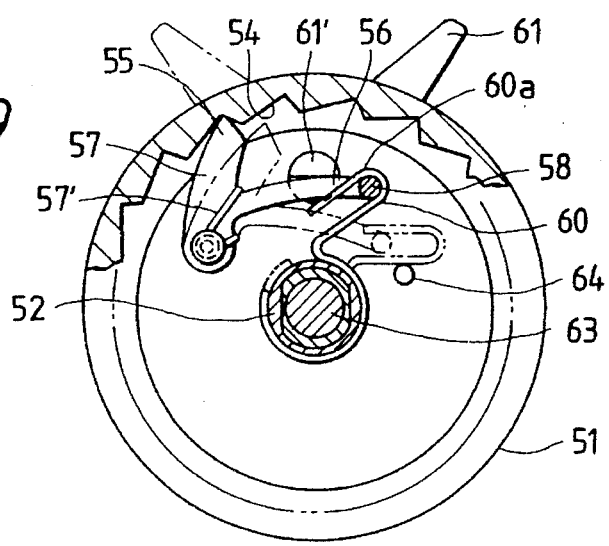
FIG. 9 is a cross-sectional view of a reverse rotation preventive mechanism which is a modification of the second embodiment.

FIG. 9 shows a reverse rotation preventive mechanism which is a modification of the second embodiment. The difference of this mechanism from the second embodiment is that a control member 60 is made of a steel wire and wound on a rotary quill 52 at the inner end of the control member 60, the engagement projection 58 of an V-shaped engagement member 57 is engaged with the bent portion of the control member 60 at the outer end thereof, and a stopper 64 is provided for the control member 60.

Figure 10:
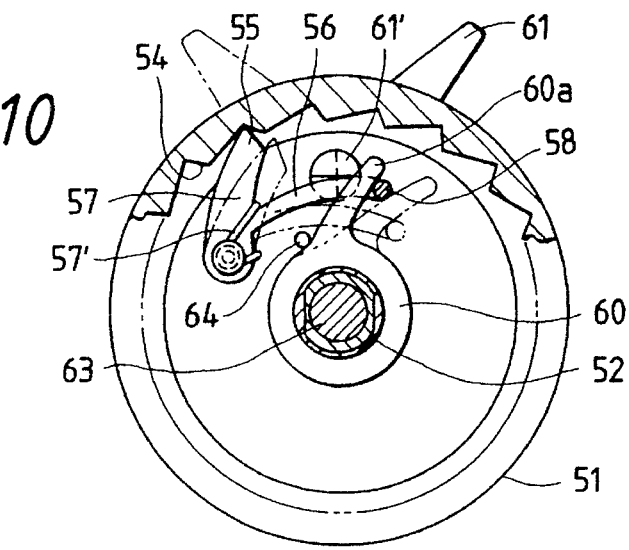
FIG. 10 is a cross-sectional view of a reverse rotation preventive mechanism which is another modification of the second embodiment.

FIG. 10 shows a reverse rotation preventive mechanism which is another modification of the second embodiment. The difference of this mechanism from the second embodiment is that a control member 60 is shaped as a digit "6" and fitted on a rotary quill 52 to cause a frictional resistance between them at the time of rotation of the rotary quill 52, and a stopper 64 is provided for the control member 60.

Figure 11:
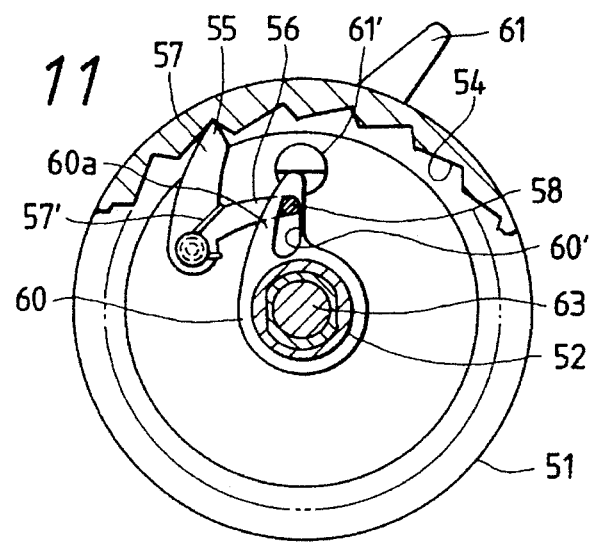
FIG. 11 is a cross sectional view of a reverse rotation preventive mechanism which is yet another modification of the second embodiment.
Figure 12:
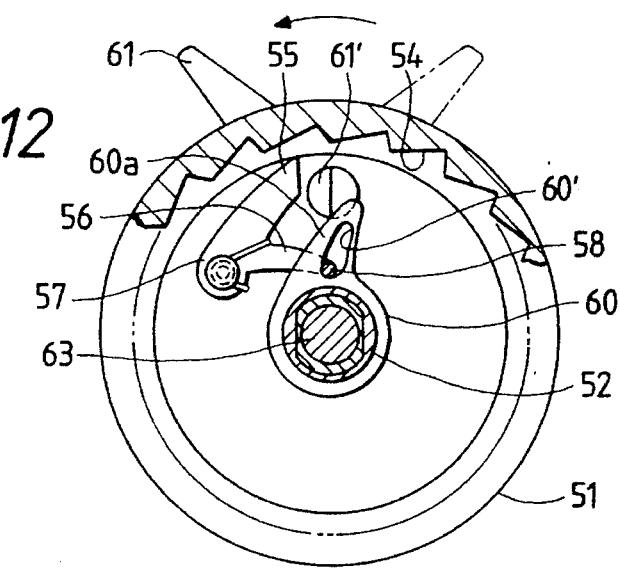
FIG. 12 is a cross-sectional view of the modified mechanism shown in FIG. 11, in the state that a rotor can be rotated either forward or backward.

FIGS. 11 and 12 show a reverse rotation preventive mechanism which is yet another modification of the second embodiment. The difference of this mechanism from the second embodiment is that a control member 60 is shaped as a digit "6", and has a slender hole 60', the engagement projection 58 of an V-shaped engagement member 57 is engaged in the hole 60, and the V-shaped engagement member 57 can be kept in a restricted position by a manipulation member 61 through the action of the control member 60.

A reverse rotation preventive mechanism provided in accordance with the present invention is of the type in which an engagement toothed portion is formed on the inside circumferential surface of the rotor of a fishing reel to prevent the reverse rotation of the rotor. Since an engagement member shaped as V and capable of being engaged with the engagement toothed portion of the rotor is supported at the front portion of the casing of the reel so as to be regulated by a control member which is swung by a rotary quill along with the rotation thereof, the mechanism can be disposed in a small space at the front portion of the casing. Since the engagement member is not in contact with the engagement portion of the rotor when it is rotated forward to wind a fishline on the reel, it is unlikely that a contact noise is made and the resistance to the rotation of the rotor increases. Therefore, the mechanism is compact, and the efficiency of the rotation of the rotor is not lowered. Besides, the mechanism minimized the quantity of the unavoidable reverse rotation of the rotor to quicken the hooking of a fish.

Although the invention is explained in connection with a spinning type reel in the above-description, the invention should not be restricted thereto or thereby. For example, the arrangement of the present invention is applicable to a double-bearing type reel having a spool rotatably supported on a reel casing so as to prevent the reverse rotation of the spool relative to the casing.

What is claimed is:

1. A reverse rotation preventive mechanism for a fishing reel having a rotor supported on a casing and rotatable in conjunction with rotation of a handle, said mechanism comprising:

an engagement toothed portion integrally formed on an inside circumferential surface of said rotor;

an engagement member pivotally supported on said casing and urged by a spring so as to engage said engagement toothed portion to allow said rotor to rotate relative to said casing in a first direction and to prevent said rotor from rotating in a second direction opposite to said first direction;

an engagement member controller slidably supported on an inner circumference of said rotor, said engagement member controller is prevented from separating from and frictionally engaged with said rotor so as to be rotated in conjunction with the rotation of said rotor, said engagement member controller having a disengaging portion; and a restriction means provided on said casing for keeping said engagement member controller in a first position where said disengaging portion completely disengages said engagement member from said engagement toothed portion against the urging of said spring when said rotor is rotated in said first direction.

2. The mechanism according to claim 1, further comprising:

a second restriction means provided on said casing for keeping said engagement member controller in a second position where said disengaging portion does not contact with said engagement member when said rotor is rotated in said second direction.

3. The mechanism according to claim 1, wherein said engagement member controller is in the form of annulus having an outside circumferential surface frictionally engaged with said inside circumferential surface of said rotor.

4. The mechanism according to claim 1, further comprising:

a change-over means provided on said reel casing for forcibly disengaging said engagement member from said engagement toothed portion against the urging of said spring to allow said rotor to rotate in both said first and second directions.

5. The mechanism according to claim 4, wherein said engagement member is substantially V-shaped having a base end pivotably mounted on a support shaft projected from said casing and first and second arms extending from said base end, said engagement member being engaged with said toothed portion through said first arm and pivotally moved by said change-over means through said second arm.

* * * * *